Feb. 4, 1930.                 H. P. BUTLER                  1,746,142
          LIQUEFIED RUBBER COMPOSITION AND METHOD OF MAKING THE SAME
                            Filed May 10, 1928
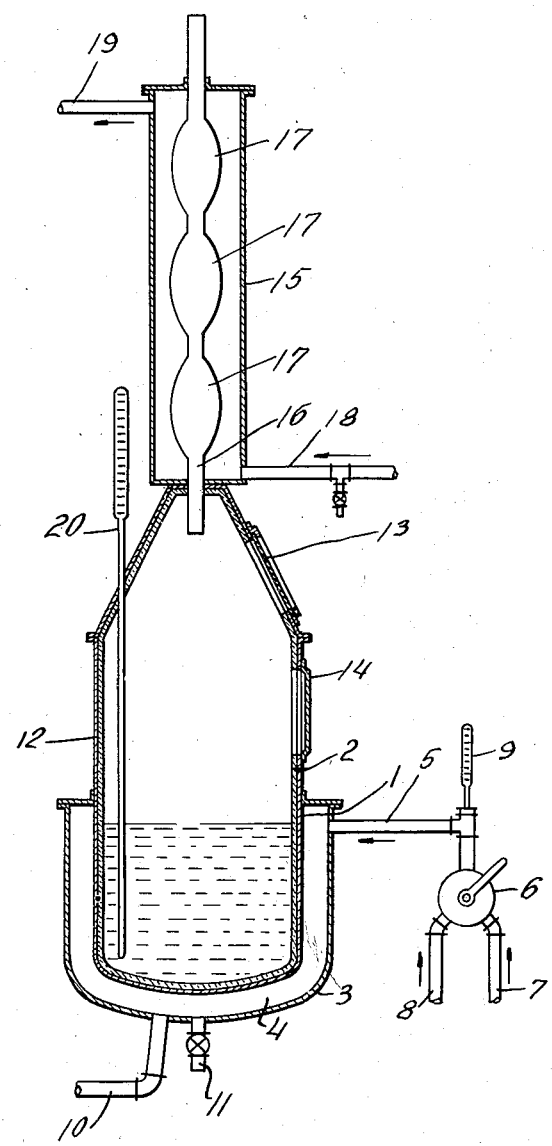
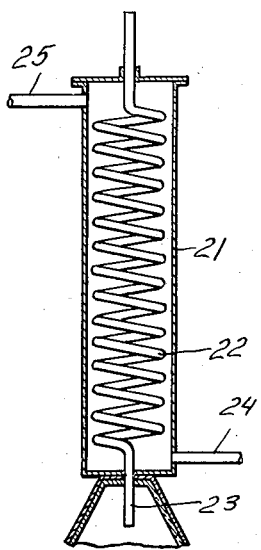
INVENTOR
Harold Page Butler
BY
Pennie Davis Marvin + Edmonds
ATTORNEYS Patented Feb. 4, 1930

1,746,142

UNITED STATES PATENT OFFICE

HAROLD PAGE BUTLER, OF NEW YORK, N. Y.

LIQUEFIED-RUBBER COMPOSITION AND METHOD OF MAKING THE SAME

Application filed May 10, 1928. Serial No. 276,641.

This invention relates to a composition of matter and the method of making the same. More specifically this invention relates to a composition of liquefied rubber and a cellulose material, such as pyroxylin or soluble cotton.

In my co-pending application, Serial No. 181,932 I have described and claimed a liquefied rubber and method of making the same and in said co-pending application I have also described a composition comprising the liquefied rubber and soluble cotton or pyroxylin. This application is to be regarded as a continuation in part of my co-pending application, Serial No. 181,932.

One of the objects of this invention is to produce a liquid composition comprising liquefied rubber and cellulose material, such as pyroxylin in soluble form the resulting composition being of a character suitable for application to surfaces by means of a brush or any other way and also being suitable for admixture with suitable ingredients rendering the product especially suitable for certain specific uses.

As an example of suitable procedure which may be employed in producing my improved composition, a liquefied rubber may be prepared in accordance with the disclosure of my co-pending application, Serial No. 181,932 and after this liquefied rubber has cooled to substantially atmospheric temperature, cellulose material, such as soluble pyroxylin or soluble cotton, may be incorporated with the liquefied rubber by simply mixing these constituents together by any means adapted to produce a uniform mixture of the two liquids.

To further explain the procedure indicated above crude rubber may be first dissolved in a suitable solvent such as benzol or toluol to which carbon tetrachloride may be added or not as desired and after the rubber solvent has become thoroughly incorporated in the crude rubber the resulting product is heated to a boiling temperature and maintained at this temperature for several hours. This heat treatment should take place in an apparatus of such a character that all of the condensable vapors or gases driven off during the heating operation are returned to the mass being heated. This heat treatment can be conveniently carried out in a still or retort preferably double jacketed and provided with a reflux condenser for condensing and returning to the retort all condensable products which have been driven off during the heating operation.

In preparing the liquefied rubber according to the procedure outlined in the preceding paragraph I find that the most satisfactory results are obtained when the temperature in the retort or kettle is maintained in the neighborhood of 100° to 120° C., the precise temperature depending upon the nature of the solvent or solvents used in conjunction with the rubber. The heating may be continued for two and one-half to three hours and as the operation progresses the supply of heat may be decreased so as to reduce the temperature to substantially 100° C.

After the liquefied rubber has been prepared the cellulose material may be incorporated therewith to produce my improved composition. A suitable cellulose preparation such as soluble cotton is mixed directly with the liquefied rubber, preferably after the rubber has cooled to approximately atmospheric temperature. I prefer to stir the liquefied rubber while slowly adding the cellulose material, the stirring being continued until the mixture becomes uniform thruout. For example, I may gradually add ½ pint to 1 pint of soluble pyroxylin to from 2 to 12 ounces of liquefied rubber while agitating the liquefied rubber and the resulting product is of uniform consistency and of great value as a surfacing or coating compound. It flows easily, is waterproof and strongly adhesive and dries to a fine finish on any surface to which it is applied. As a further example, to the quantity of liquefied rubber prepared by utilizing 8 ounces of crude rubber with 1 gallon of benzol I subsequently add approximately 8 ounces of soluble cotton, the soluble cotton being added preferably after the liquefied rubber has been thinned to some extent by the addition of a suitable solvent. By adding to the resulting composition one quart of butyl acetate I may obtain about five quarts of a product suitable for use as a lacquer. Amyl acetate, ethyl acetate or other solvents may be used instead of the butyl acetate and the resulting composition may be thinned out to the desired extent by employing a suitable solvent. Furthermore, other suitable ingredients may be added to the composition. Various pigments may be added, and if the composition is to be used for coating textiles, suitable solvents, such as naphtha, kerosene, castor oil, linseed oil, et cetera may be incorporated with the solution of liquefied rubber and cellulose material and suitable fillers such as china clay and lamp black may be added when desired. My improved composition of liquefied rubber and cellulose derivatives may be used as a base from which paints and varnishes can be prepared by adding the necessary ingredients. Thus the liquid composition may be rendered suitable for use as a rubberized and cellulosic paint by adding to the composition a dryer, a pigment and a properly treated gum in suitable proportions.

In the accompanying drawings I have illustrated several forms of apparatus suitable for preparing the liquefied rubber which forms a part my improved composition. In the drawings, Fig. 1 is a vertical, sectional view of a double-jacketed kettle and reflux condenser associated therewith; and Fig. 2 is a similar view of another form of condenser.

The mixture of rubber and solvent is boiled in a double-jacketed kettle or still consisting of an inner container 1 preferably provided with a lining 2 of glass or other suitable inert material. An outer container surrounds the lower portion of the inner container and is spaced therefrom to provide a jacket 4. This jacket is provided with an inlet pipe 5 connected to a mixing valve 6. A steam and hot water pipe 7 is connected to the mixing valve and a cold water pipe 8 is also connected to the mixing valve so that fluid of a desired temperature may be delivered into the jacket. A thermometer 9 is arranged in the feed pipe 5. The jacket is provided with an outlet pipe 10 and with a drain pipe 11 having a valve therein. A hood 12 is arranged over the kettle and is provided with a window 13 so that the operation of the condenser may be noted from time to time. A door 14 is also provided in the hood, below the window 13. The hood is glass lined, like the kettle proper.

A reflux condenser 15 is mounted on the top of the hood and is provided with an airtight connection. The vapors from the kettle pass thru an inner glass pipe 16 within the condenser which is provided with enlargements 17 at spaced intervals and cold water is adapted to circulate in the condenser casing around the vapor pipe. The cold water is delivered to the bottom of the condenser casing thru an inlet pipe 18 and is discharged from the top thru an outlet pipe 19. A thermometer 20 may extend thru a suitable packing in the hood into the interior of the kettle.

In the form of the invention shown in Fig. 2 of the drawings, the condenser casing 21 is provided with an inner glass coil 22 having a depending pipe 23 which extends thru the hood by means of which the vapors pass into the coil. Cold water is circulated thru the condenser casing by means of an inlet pipe 24 and an outlet pipe 25.

In practicing the process, a quantity of rubber is dissolved in a suitable rubber solvent such as benzol or toluol and allowed to stand until the rubber becomes softened. The dissolved rubber is then placed in the kettle 1 and hot or boiling water is delivered to the jacket 4 thru the feed pipe 5, the mixing valve 6 being properly regulated to supply the water at a desired temperature. Steam may be fed thru the pipe 7 if necessary to raise the temperature of the contents of the kettle to the desired value between 100° C. and 120° C. The rubber and solvent are brought to a boiling state and the fumes pass into the reflux condenser. As the condensable portion of the fumes or vapor are condensed by the cold water, they drop back into the kettle; the non-condensable constituents of the rubber and solvent are discharged to the atmosphere. After the contents of the kettle begin to boil the temperature is reduced to approximately 100° C. and the contents of the kettle are maintained at this temperature for from two and one-half to three hours to permit the escape of a large portion of the non-condensable volatile matter and to bring the residue to the desired liquefied condition.

It is desirable to have all interconnecting parts of the apparatus carefully sealed to prevent accidental entrance of moisture or air.

After preparing the liquefied rubber as above described I prefer to cool the liquefied rubber and then mix therewith a cellulose material such as soluble pyroxylin or soluble cotton. What is known as 24 ounce soluble cotton, that is soluble cotton comprising 24 ounces of cotton or cellulose dissolved in a gallon of solvent, gives very satisfactory results but it will be understood that the invention is not limited to the use of this particular form of the cellulose ingredient.

As an example of one embodiment of my improved process I may dissolve from 5 to 8 ounces of crude rubber in a quart of benzol and add thereto from 4 to 5 pints of carbon tetrachloride. This mixture may be boiled from 2½ to 3 hours at a temperature between 100° C. and 120° C. After the boiled mixture has been cooled, ½ pint to 1 pint of pyroxylin may be incorporated with the mixture. While boiling the rubber solution the condensable volatilized products should be continuously returned to the solution so that the final product will contain the cellulose material and liquefied rubber which contains substantially all the substance of the original crude rubber, except the products driven off during the boiling operation in the form of non-condensable gases. Carbon tetrachloride is employed where it is desirable to produce a product which is less inflammable than the product obtained without the use of such a composition.

It is to be understood that my invention is not confined to the specific embodiments and examples herein described in detail but includes such modifications thereof as fall within the scope of the appended claims.

I claim:

1. A composition comprising liquefied rubber and pyroxylin, the liquefied rubber containing substantially all of the condensable products obtained upon boiling crude rubber dissolved in a suitable solvent.

2. A composition comprising liquefied rubber and pyroxylin, the liquefied rubber containing substantially all of the condensable products obtained upon boiling crude rubber dissolved in a suitable solvent, at temperatures between 100° C. and 120° C.

3. A composition comprising liquefied rubber, pyroxylin, benzol and carbon tetrachloride, the liquefied rubber containing substantially all of the condensable products obtainable upon boiling crude rubber dissolved in a suitable solvent.

4. A composition comprising nitrocellulose and the reaction products of rubber and a suitable solvent selected from a group consisting of benzol, toluol and carbon tetrachloride, the composition containing substantially all of the condensable products obtainable upon boiling crude rubber dissolved in the solvent at a temperature between 100° C and 120° C.

5. A composition comprising liquefied rubber and nitrocellulose, the liquefied rubber and cellulose material being in the approximate proportions of ½ pint to 1 pint of cellulose material to 5 to 8 ounces of liquefied rubber, the liquefied rubber containing substantially all of the condensable products obtainable upon boiling crude rubber dissolved in a suitable solvent.

6. A composition comprising liquefied rubber and nitrocellulose, the liquefied rubber and cellulose material being in the approximate proportions of ½ pint to 1 pint of cellulose material to 2 to 12 ounces of liquefied rubber, the liquefied rubber containing substantially all of the condensable products obtainable upon boiling crude rubber dissolved in a suitable solvent.

In testimony whereof I affix my signature.

HAROLD PAGE BUTLER.